(12) United States Patent
Malevsky

(10) Patent No.: US 10,712,875 B2
(45) Date of Patent: Jul. 14, 2020

(54) DIGITAL SWITCH-CAPACITOR BASED BANDGAP REFERENCE AND THERMAL SENSOR

(71) Applicant: Sharon Malevsky, Tel-Aviv (IL)

(72) Inventor: Sharon Malevsky, Tel-Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,264

(22) PCT Filed: Sep. 27, 2013

(86) PCT No.: PCT/US2013/062222
§ 371 (c)(1),
(2) Date: Dec. 24, 2013

(87) PCT Pub. No.: WO2015/047303
PCT Pub. Date: Apr. 2, 2015

(65) Prior Publication Data
US 2016/0224146 A1 Aug. 4, 2016

(51) Int. Cl.
*G06F 3/044* (2006.01)
*G01K 7/01* (2006.01)
*G05F 3/30* (2006.01)

(52) U.S. Cl.
CPC ........... *G06F 3/044* (2013.01); *G01K 7/01* (2013.01); *G05F 3/30* (2013.01)

(58) Field of Classification Search
CPC ..... G05F 3/02; G05F 3/16; G05F 3/30; G05F 3/10; G05F 3/08; G05F 3/20; G05F 3/205;
(Continued)

(56) References Cited

U.S. PATENT DOCUMENTS 5,352,972 A * 10/1994 Pernici ............... G11O 27/026
323/313
5,408,174 A * 4/1995 Leonowich ............ G05F 3/262
323/315
(Continued)

FOREIGN PATENT DOCUMENTS

RU 2493592 9/2013
RU 2493592 C1 9/2013

OTHER PUBLICATIONS

Notification of Transmittal of the International Search Report and the Written Opinion of the International Searching Authority, or the Declaration for International Application No. PCT/US2013/062222, dated Jul. 10, 2014, 7 pages.
(Continued)

*Primary Examiner* — Nitin Patel
*Assistant Examiner* — Amen Woldesenbet Bogale
(74) *Attorney, Agent, or Firm* — Womble Bond Dickinson (US) LLP

(57) ABSTRACT

Described is an apparatus of a thermal sensor and/or bandgap reference circuit which is independent of an operational amplifier. The apparatus comprises: a forward biased diode circuit having one or more diodes; a first switch-capacitor sampler coupled to the forward biased diode circuit, the first switch-capacitor sampler to provide a reference voltage which is proportional to absolute temperature; and a second switch-capacitor sampler coupled to the forward biased diode circuit.

11 Claims, 8 Drawing Sheets

(58) Field of Classification Search
CPC ....... G05F 3/267; G01K 7/01; Y10S 323/904; H04M 1/403; H04M 1/442; H04M 1/466; H03M 2201/8164
See application file for complete search history.

(56) References Cited

U.S. PATENT DOCUMENTS

| | | | | |
|---|---|---|---|---|
| 5,867,012 | A * | 2/1999 | Tuthill | G05F 3/30 |
| | | | | 323/313 |
| 6,060,874 | A * | 5/2000 | Doorenbos | G05F 3/30 |
| | | | | 323/316 |
| 6,215,353 | B1 * | 4/2001 | Lewyn | G05F 3/30 |
| | | | | 323/313 |
| 6,784,725 | B1 * | 8/2004 | Wadhwa | G05F 3/30 |
| | | | | 327/337 |
| 6,819,163 | B1 * | 11/2004 | Gregoire, Jr. | G05F 3/262 |
| | | | | 327/536 |
| 6,847,319 | B1 * | 1/2005 | Stockstad | G01K 7/01 |
| | | | | 341/119 |
| 7,082,377 | B1 * | 7/2006 | Aslan | G01K 7/01 |
| | | | | 327/512 |
| 7,112,948 | B2 * | 9/2006 | Daly | G05F 3/30 |
| | | | | 323/316 |
| 7,342,390 | B2 * | 3/2008 | Tachibana | G05F 3/30 |
| | | | | 323/313 |
| 7,429,129 | B2 * | 9/2008 | St. Pierre | G01K 7/01 |
| | | | | 327/512 |
| 7,786,792 | B1 * | 8/2010 | Gay | G05F 3/30 |
| | | | | 327/513 |
| 9,013,231 | B1 * | 4/2015 | Manea | G05F 3/30 |
| | | | | 327/539 |
| 2007/0040600 | A1 * | 2/2007 | Tachibana | G05F 3/30 |
| | | | | 327/539 |
| 2008/0116966 | A1 * | 5/2008 | Chae | H03H 19/004 |
| | | | | 327/554 |
| 2010/0097354 | A1 * | 4/2010 | Ahn | G06F 3/0412 |
| | | | | 345/175 |
| 2010/0188141 | A1 * | 7/2010 | Aruga | G05F 3/30 |
| | | | | 327/539 |
| 2013/0120930 | A1 | 5/2013 | Temkine et al. | |
| 2013/0154721 | A1 * | 6/2013 | Kumar | G05F 3/30 |
| | | | | 327/539 |
| 2013/0241526 | A1 | 9/2013 | Ozasa et al. | |
| 2013/0293289 | A1 * | 11/2013 | Ivanov | G05F 3/20 |
| | | | | 327/539 |
| 2014/0002052 | A1 * | 1/2014 | Schaffer | G05F 3/30 |
| | | | | 323/316 |
| 2014/0071221 | A1 * | 3/2014 | Dave | H04M 1/03 |
| | | | | 348/14.02 |
| 2014/0224962 | A1 * | 8/2014 | Pahr | G05F 3/02 |
| | | | | 250/208.1 |

OTHER PUBLICATIONS

Notification Concerning Transmittal of International Preliminary Report on Patentability of the International Searching Authority issued for International Patent Application No. PCT/US2013/062222, dated Apr. 7, 2016.

* cited by examiner

DIGITAL SWITCH-CAPACITOR BASED BANDGAP REFERENCE AND THERMAL SENSOR

CLAIM OF PRIORITY

This application claims the benefit of priority of International Patent Application No. PCT/US2013/062222 filed Sep. 27, 2013, titled "DIGITAL SWITCH-CAPACITOR BASED BANDGAP REFERENCE AND THERMAL SENSOR," which is incorporated by reference in its entirety.

BACKGROUND

A bandgap reference generator is used to generate a constant bandgap reference voltage. This constant bandgap reference voltage may be temperature independent and can be used for different applications. For example, the constant bandgap reference voltage may be used in digital-to-analog converters (DACs), phase locked loops (PLLs), linear voltage regulators (VRs), DC-DC converters, RF (radio-frequency) circuits, thermal sensors, etc.

Bandgap reference generators are typically analog circuits that require certain voltage headroom for proper operation. Digital circuits, however, are being operated on lower power supplies every process generation to save power consumption.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
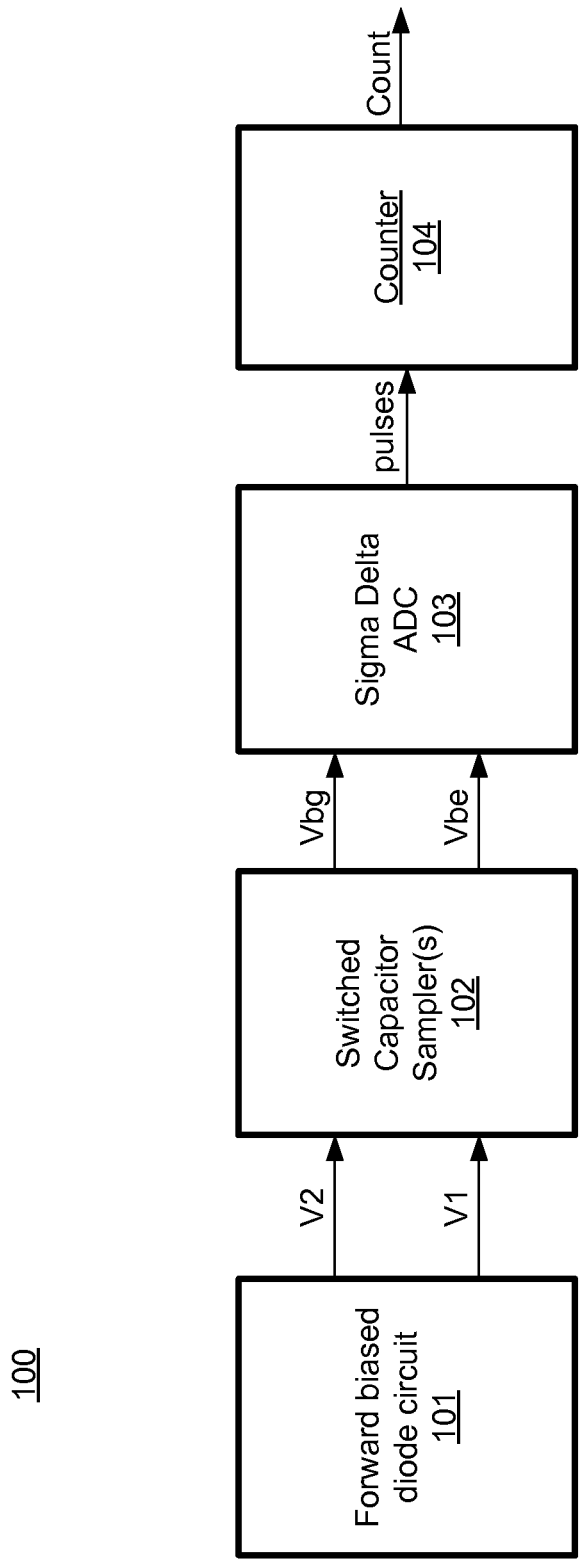
FIG. 1 illustrates a high level architecture of a switch-capacitor based bandgap reference and thermal sensor, according to one embodiment of the disclosure.

The embodiments describe a digital switch-capacitor based bandgap reference and thermal sensor. In one embodiment, digital switch-capacitor based bandgap reference and thermal sensor comprises a sigma-delta based analog-to-digital converter (ADC) coupled to a one or more switch-capacitor based samplers and forward biased diode circuits. Typical ADCs, which may be used in thermal sensor circuits, require the use of a fixed voltage reference i.e., a reference independent of temperature and power supply level. An example of such voltage reference is a bandgap voltage reference. Bandgap reference generators to generate bandgap voltage reference use an additional regulator and unity gain buffer, which are both area and power consuming circuits, to provide the continuous time bandgap reference input. The embodiments use a switch-capacitor based bandgap reference instead of continuous time bandgap reference. In one embodiment, use of unity gain amplifier is eliminated by using inverter(s) based switching capacitors to generate switch-capacitor based bandgap reference.

One technical effect of using a switch-capacitor based bandgap reference instead of continuous time bandgap reference is that circuit area is reduced (e.g., by 70%) over traditional bandgap reference generators and thermal sensors. In one embodiment, a single diode is used to generate bandgap reference and thermal sensor. In such an embodiment, additional area is reduced. The embodiments discussed here can properly operate at low power supplies (e.g., 0.9V). In one embodiment, the switch-capacitor based bandgap reference and thermal sensor is independent of a startup circuit which is used for traditional bandgap circuits. The absence of the startup circuit further reduces area and power of the embodiments. The embodiments also provide a built-in offset cancellation apparatus without the need of separate offset cancellation circuits, which further reduces power consumption and area. The embodiments, being largely digital design, are scalable over process nodes. The embodiments can also be reconfigured to execute different mathematical functions. The above technical effects are exemplary technical effects, and are not limiting effects.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors, Gate All Around Cylindrical Transistors or other devices implementing transistor functionality like carbon nano tubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates a high level architecture 100 of a switch-capacitor based bandgap reference and thermal sensor, according to one embodiment. In one embodiment, architecture 100 comprises forward biased diode circuit 101, switch-capacitor based sampler(s) 102 the sampler is the circuit that samples the diode voltage (Vbe) and converts the diode voltages to a reference signal (Vbg), sigma-delta ADC 103, and counter 104. In one embodiment, for generating a bandgap reference voltage, sigma-delta ADC 103 and counter 104 may not be used.

In one embodiment, forward biased diode circuit 101 comprises one or more diodes and current source(s). In one embodiment, forward biased diode circuit 101 comprises a first branch having a first current source and a single diode (i.e., high current density diode); a second branch having a second current source and a diode with multiple instances; and a third branch having a third current source to provide reference current. In one embodiment, forward biased diode circuit 101 is independent of any startup circuit. In various embodiments, the one or more diodes may be implemented as actual PN junction diodes, as the base-emitter junction of a bipolar transistor (BJT), parasitic BJT of a CMOS transistor, or as another component with an exponential I(V) characteristic. The generic term "diode" here refers to these circuit elements. In some embodiments, a "string" of several diodes or base-emitter junctions may be formed in series, instead of a single diode or transistor.

In one embodiment, switch-capacitor sampler 102 samples voltage nodes V1 and V2 of forward biased diode circuit 101 to generate non-continuous time reference Vbg and Vbe i.e., switching voltages. In one embodiment, switch-capacitor sampler 102 is independent of any unity gain operational amplifier. In one embodiment, switch-capacitor sampler 102 operates with at least two clock signals of different phases such that in one phase internal node(s) of switch-capacitor sampler 102 is pre-charged and in another phase internal node(s) of switch-capacitor sampler 102 transfers change.

In one embodiment, switch-capacitor sampler 102 includes a first switch-capacitor sampler (discussed with reference to FIGS. 2-5) coupled to forward biased diode circuit 101 to provide a reference voltage Vbg which is independent of temperature (reference). In one embodiment, first switch-capacitor sampler is a dual input switch-capacitor sampler. For example, first switch-capacitor samples voltage nodes from two different branches of forward biased diode circuit 101 to generate bandgap based reference. In one embodiment, switch-capacitor sampler 102 includes a second switch-capacitor sampler (discussed with reference to FIGS. 2-5) coupled to forward biased diode circuit 101 to provide diode voltage Vbe (i.e., base-emitter voltage of a PN junction). In one embodiment, second switch-capacitor sampler is a single input switch-capacitor sampler.

In one embodiment, switch-capacitor outputs Vbg (i.e., reference) and Vbe (i.e., signal) are input to sigma-delta ADC 103. In one embodiment, sigma-delta ADC 103 is a single bit sigma-delta ADC. In other embodiments, multiple bit sigma-delta ADC may be used. In one embodiment, output of sigma-delta ADC 103 are pulses (or pulse train) in sampling clock frequency, where the number of pulses over a given time interval is equal to the ratio between signal (i.e., Vbe) to the reference (i.e., Vbg). In one embodiment, counter 104 receives pulses from sigma-delta ADC 103 and outputs a count of the pulses. In one embodiment, the count indicates the temperature sensed by the one or more diodes of forward biased diode circuit 101.

Figure 2:
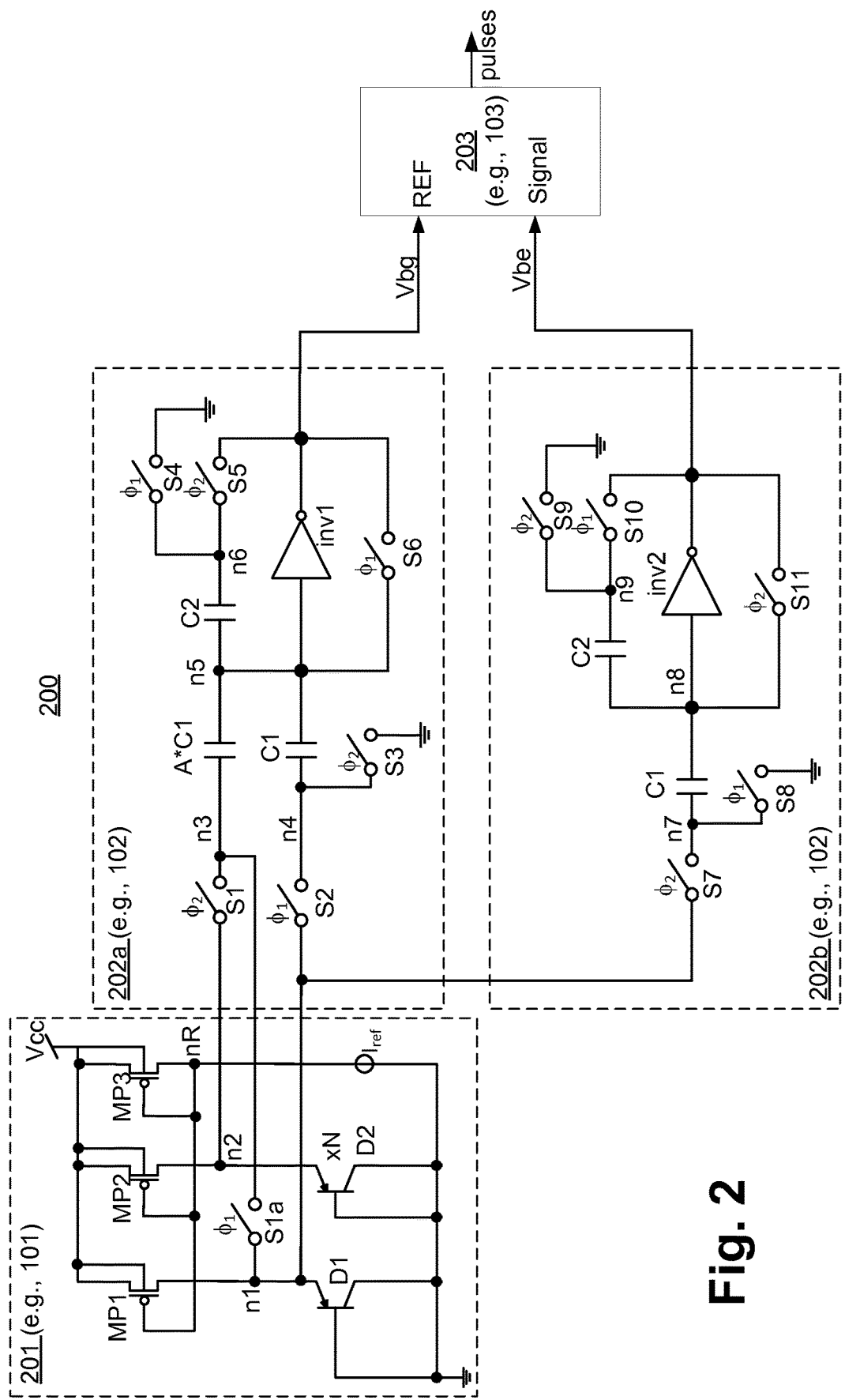
FIG. 2 is an open loop dual diode switch-capacitor based digital thermal sensor, according to one embodiment of the disclosure.

FIG. 2 is architecture 200 of an open loop dual diode switch-capacitor based digital thermal sensor, according to one embodiment of the disclosure. It is pointed out that those elements of FIG. 2 having the same reference numbers (or names) as the elements of any other figure can operate or function in any manner similar to that described, but are not limited to such. In one embodiment, architecture 200 comprises forward biased diode circuit 201 (e.g., 101), first switch-capacitor sampler 202a (e.g., part of 102), second switch-capacitor sampler 202b (e.g., part of 102), and sigma-delta modulator 203 (e.g., 103).

In one embodiment, forward biased diode circuit 201 comprises a first branch having p-type transistor(s) MP1 coupled in series with diode D1. In one embodiment, diode D1 is a single diode (i.e., high current density diode). In one embodiment, gate terminal of MP1 is coupled to node nR which provides a bias voltage using third branch having diode-connected MP3 and reference current circuit Iref.

In one embodiment, forward biased diode circuit 201 comprises a second branch having p-type transistor(s) MP2 coupled in series with diode D2, where diode D2 is 'N' times larger than diode D1, and where 'N' is an integer greater than one. For example, diode D2 is formed by coupling in parallel 'N' diodes D1. In one embodiment, the current through diode D2 is 'N' times the current through diode D1. In one embodiment, gate terminal of MP2 is coupled to node nR which provides a bias voltage using a third branch having diode-connected MP3 and reference current circuit Iref.

In one embodiment, source terminals of transistors MP1, MP2, and MP3 are coupled to power supply Vcc. In one embodiment, drain terminal of MP1 is coupled to diode D1. In one embodiment, drain terminal of MP2 is coupled to diode D2. In one embodiment, gate and drain terminals of MP3 are coupled to node nR which is biased by current source Iref. In one embodiment, forward biased diode circuit 201 comprises a switch S1a controllable by clock signal $\Phi_1$. In one embodiment, switch S1a is operable to couple node n1 (i.e., drain terminal of MP1) to node n2 (i.e., drain terminal of MP2) when switch S1a is closed. In one embodiment, switch S1a is formed from a single transistor pass-gate (e.g., p-type or n-type pass gate) or a dual transistor transmission gate (e.g., n-type and p-type transistors coupled in parallel and controllable by $\Phi_1$ and its inverse).

In one embodiment, first switch-capacitor sampler 202a comprises a first switch S1 controllable by $\Phi_2$, where $\Phi_2$ is inverse of $\Phi_1$, and where switch S1 is operable to couple nodes n2 and n3 when switch S1 is closed. In one embodiment, first switch-capacitor sampler 202a comprises a second switch S2 controllable by $\Phi_1$, where switch S2 is operable to couple nodes n1 and n4. In one embodiment, first switch-capacitor sampler 202a comprises capacitor C1 coupled to nodes n4 and n5. In one embodiment, first switch-capacitor sampler 202a comprises third switch S3 controllable by $\Phi_2$, where third switch S3 is operable to couple node n4 to ground (i.e., Vss). Here, $\Phi_2$ is a clock signal which is 90 degrees out of phase compared to phase of phase of $\Phi_1$ (i.e., $\Phi_2$ is inverted version of clock signal $\Phi_1$).

In one embodiment, first switch-capacitor sampler 202a comprises another capacitor coupled to nodes n3 and n5, where the other capacitor is A*C1, and where 'A' is a constant to compensate for Vbe1. In one embodiment, first switch-capacitor sampler 202a comprises a second capacitor C2 coupled to nodes n5 and n6. The relationship in capacitor sizes of capacitors C1 and C2 may depend on desired output voltage level. In one embodiment, the gain of the first switch-capacitor sampler 202a is C1/C2.

In one embodiment, first switch-capacitor sampler 202a comprises fourth switch S4 controllable by $\Phi_1$, where switch S4 is operable to couple nodes n6 and ground. In one embodiment, first switch-capacitor sampler 202a comprises fifth switch S5 controllable by $\Phi_2$, where switch S5 is operable to couple nodes n6 and Vbg, and where Vbg provides non-continuous bandgap reference to signal-delta ADC 103. In one embodiment, first switch-capacitor sampler 202a comprises sixth switch S6 controllable by $\Phi_1$, where switch S6 is operable to couple nodes n5 and Vbg. In one embodiment, first switch-capacitor sampler 202a comprises a first inverter inv1 with its input coupled to node n5 and output coupled to Vbg. In one embodiment, no operational amplifier is used in first switch-capacitor sampler 202a.

In one embodiment, second switch-capacitor sampler 202b comprises a seventh switch S7 controllable by $\Phi_2$, where switch S7 is operable to couple nodes n1 and n7. In one embodiment, second switch-capacitor sampler 202b comprises a first capacitor C1 coupled to nodes n7 and n8. In one embodiment, second switch-capacitor sampler 202b comprises eighth switch S8 controllable by $\Phi_1$, where switch S8 is operable to couple nodes n7 and ground. In one embodiment, second switch-capacitor sampler 202b comprises second capacitor C2 coupled to nodes n8 and n9. In one embodiment, second switch-capacitor sampler 202b comprises a ninth switch S9 controllable by $\Phi_2$, where switch S9 is operable to couple nodes n9 and ground.

In one embodiment, second switch-capacitor sampler 202b comprises tenth switch S10 controllable by $\Phi_1$, where switch S10 is operable to couple nodes n9 to Vbe. In one embodiment, second switch-capacitor sampler 202b comprises eleventh switch S11 controllable by $\Phi_2$, where switch S11 is operable to couple nodes n8 and Vbe. In one embodiment, second switch-capacitor sampler 202b comprises a second inverter inv2 with its input coupled to node n8 and output coupled to Vbe. In one embodiment, no operational amplifier is used in second switch-capacitor sampler 202b.

Assuming switch S7 is closed i.e., node n1 is coupled to node n7, second switch-capacitor sampler 202b operates as follows. In phase 1 (i.e., $\Phi_2$ causes switch S9 to close while $\Phi_1$ causes switches S8, S9, and S11 to remain open), voltage across first capacitor C1 of second switch-capacitor sampler 202b is Vin-Vtrip, where Vin is voltage on node n7 and Vtrip is voltage on node n8 which represents tripping voltage of inverter inv2. In phase 1, voltage across second capacitor C2 is equal to Vtrip because node n6 is coupled to ground. Phase 1 is the pre-charge phase in which capacitors C1 and C2 are pre-charged. In one embodiment, phase 2 is the pre-charge phase, and phase 1 is the charge transfer phase i.e., $\Phi_1$ switches are closed in phase 1 and $\Phi_2$ switches are close in phase 2.

In phase 2 (i.e., $\Phi_2$ causes switch S9 to open while $\Phi_1$ causes switches S8, S9, and S11 to close), charge from capacitors C1 and C2 are transferred. In this embodiment, charge contained in capacitor C2 is QC2=Vin*C1+Vtrip*C2, where Vin is voltage on node n7 and Vtrip is voltage on node n8 which represents tripping voltage of inverter inv2. In phase 1, node n7 is grounded. Vout (i.e., voltage on node Vbe) is given as (C1/C2)*Vin i.e., sampled Vbe provided to sigma-delta modulator 203 depends on voltage on node n1 (i.e., Vbe1) and ratio of capacitors C1 and C2. In one embodiment, the offset cancellation is performed by charging C2 to Vtrip level and keeping voltage on node n8 at Vtrip level where the two cancel each other from the node Vbe.

Operation of first switch-capacitor sampler 202a is similar to the operation of second switch-capacitor sampler 202b. Following the same logic of pre-charge phase (i.e., phase 1) and charge transfer phase (i.e., phase 2), output Vbg of first switch-capacitor sampler 202a is equal to (C2/C1)*(A*(V1−V2)+V1), where V1 is the voltage on node n2 when switch S1a is open, and where V2 is the voltage on node n1. The voltage on node n1 is Vbe1 (i.e., voltage between base and emitter of D1) while V1−V2 is a PTAT voltage. In one embodiment, first switch-capacitor sampler 202a samples a differential component (i.e., V1−V2) and adds a single ended component (i.e., V1).

In one embodiment, sigma-delta ADC 203 samples Vbe in phase 1 and Vbg in phase 2 cycle i.e., in phase 1 Vbe sample is set to charge transfer (when the output is valid) while Vbg is in pre-charge state and, in the following half cycle Vbe is in pre-charge state and Vbg is in charge transfer state. In one embodiment, temperature is computed by comparing Vbe with Vbg (which is a reference).

For example, number of pulses from sigma-delta ADC 203 is measured when temperature is set to −10° C. and when temperature is set to 110° C., and a linear (or substantially linear) relationship of Vbe at −10° C. and 110° C. is established. In one embodiment, 'A' is calibrated so Vbg voltage is substantially constant over temperature. In one embodiment, counter 104 measures the number of pulses from sigma-delta ADC 203. The number of pulses indicates a ratio of measured signal Vbe to reference Vbg. This ratio is substantially constant with temperature and is used to determine temperature sensed by the diodes D1 and D2.

In one embodiment, sigma-delta ADC 103 exhibits a strong PSRR (power supply rejection ratio) compared to the PSRR of the sampler(s) 102. In one embodiment, PSRR of sigma-delta ADC 103 can be further improved by adding dithering mechanisms.

Figure 3:
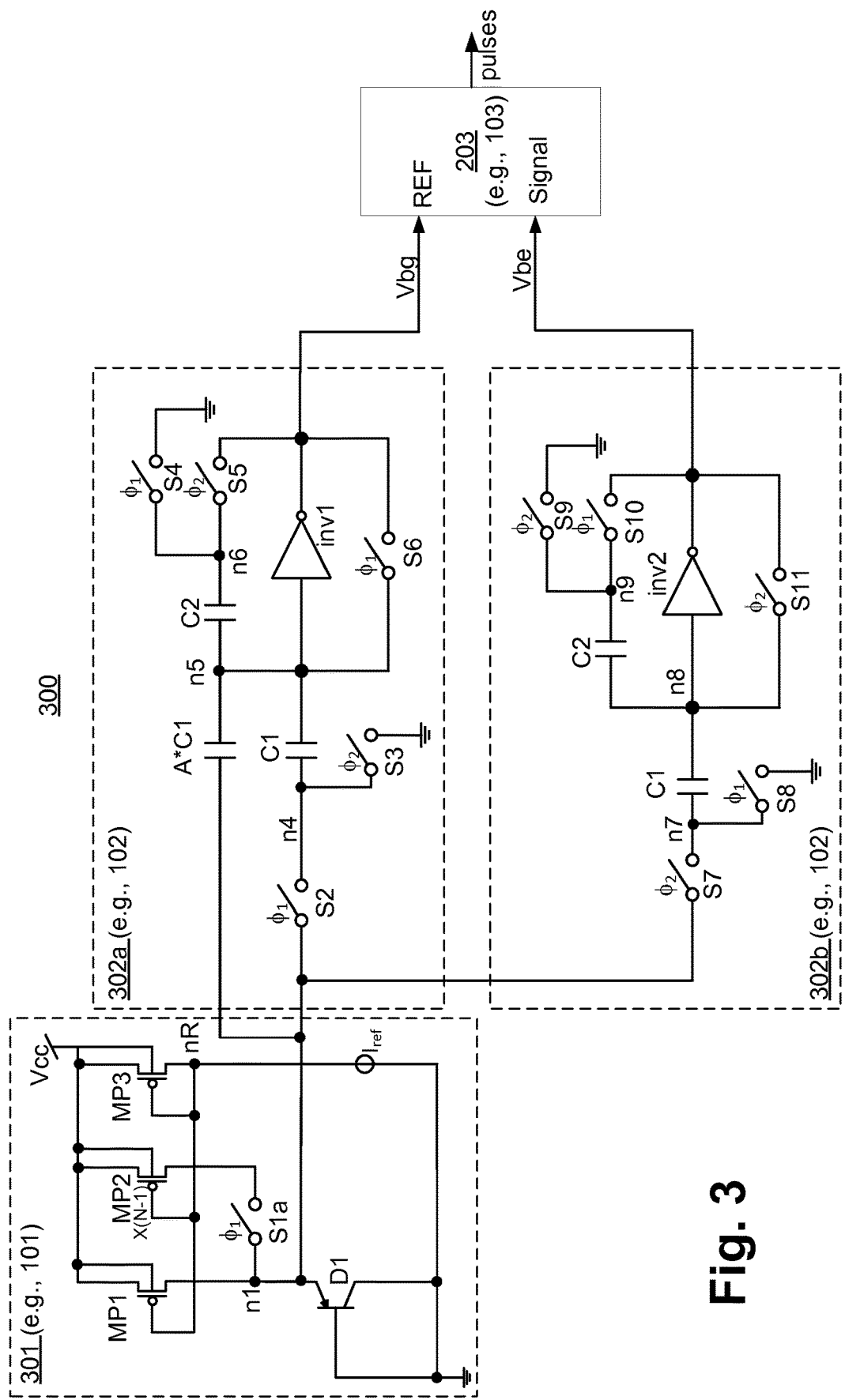
FIG. 3 is an open loop single diode switch-capacitor based digital thermal sensor, according to one embodiment of the disclosure.

FIG. 3 is architecture 300 of an open loop single diode switch-capacitor based digital thermal sensor, according to one embodiment of the disclosure. It is pointed out that those elements of FIG. 3 having the same reference numbers (or names) as the elements of any other figure can operate or function in any manner similar to that described, but are not limited to such. Architecture 300 is similar to architecture 200. So as not to obscure the embodiments, differences between architectures 300 and 200 are discussed. Functionally, both architectures 300 and 200 provide the ability to sense temperature.

In one embodiment, architecture 300 comprises forward biased diode circuit 301 (e.g., 101) which uses a single branch diode D1 i.e., diode is only in the first branch. As discussed with reference to FIG. 2, diode D1 is a high current density diode. In one embodiment, diode D1 is a single diode. In this embodiment, forward biased diode circuit 301 does not have 'N' number of diodes in the second branch. In one embodiment, third branch of architecture 300 is similar to the third branch of architecture 200.

In one embodiment, architecture 300 comprises a first switch-capacitor sampler 302a (e.g., 102). Compared to first switch-capacitor sampler 202, first switch-capacitor sampler 302 does not have first switch S1. In this embodiment, capacitor with capacitance A*C1 is coupled between nodes n5 and n1. The other components of first switch-capacitor sampler 302a are similar to components of first switch-capacitor sampler 202a.

In one embodiment, architecture 300 consumes less power and area than architecture 200 because forward biased diode circuit 301 is smaller in size than forward biased diode circuit 201 (which includes N times more diode D1s) and because first switch-capacitor sampler 302a has fewer samplers than first switch-capacitor sampler 202a. In one embodiment, the high current flows through the diode only at phase 1. In one embodiment, architecture 300 comprises a second switch-capacitor sampler 302b (e.g., 102) which is similar to second switch-capacitor sampler 202b.

In one embodiment, each sampler (i.e., sampler 302a and 302b) of architecture 300 samples the same diode branch in each phase. Here, each current source (i.e., MP1 and MP2) has a different current. In one embodiment, current density through diode D1 is changed in each cycle (of Φ1) by changing the current source for diode D1. In one embodiment, current density through diode D1 is changed by switching the number of MP2 (X(N−1)) branches coupled to diode D1, where 'X' represent a transistor (part of MP2), and where 'N' is an integer representing number of 'X' transistor being coupled in parallel.

Figure 4:
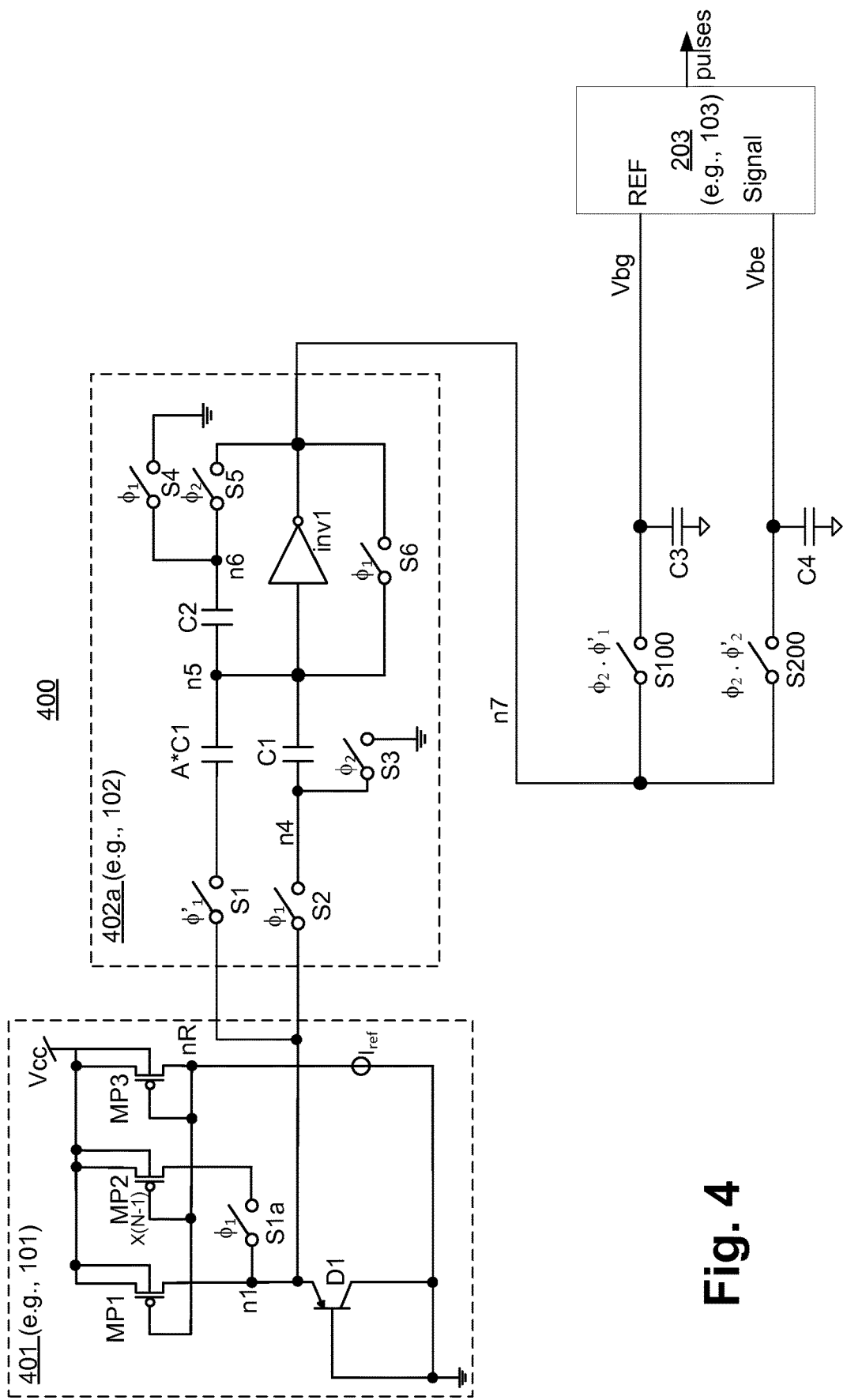
FIG. 4 is an open loop single switch-capacitor single diode based digital thermal sensor, according to another embodiment of the disclosure.

FIG. 4 is architecture 400 of an open loop single switch single diode based digital thermal sensor, according to another embodiment. It is pointed out that those elements of FIG. 4 having the same reference numbers (or names) as the elements of any other figure can operate or function in any manner similar to that described, but are not limited to such. Architecture 400 is similar to architectures 200 and 300. So as not to obscure the embodiments, differences between architectures 400 and 200/300 are discussed. Functionally, both architectures 400 and 200/300 provide the ability to sense temperature.

In one embodiment, architecture 400 comprises a forward biased diode circuit 401 (e.g., 101) which is similar to forward biased diode circuit 301. In this embodiment, second switch-capacitor sampler (like 202b, or 303b) is not used, and so further area and power are reduced compared to the embodiments of FIG. 2 and FIG. 3. Referring back to FIG. 4, architecture 400 comprises a dual input switch-capacitor sampler 402a which is similar to first switch-capacitor sampler 202a. In this embodiment, first switch S1 of dual input switch-capacitor sampler 402a is controllable by $\Phi'_1$ instead of $\Phi_1$, where $\Phi'_1$ is a clock signal derived by dividing $\Phi_1$ clock signal by two.

In one embodiment, output of dual input switch-capacitor sampler 402a is not directly provided as Vbg to sigma-delta ADC 203, but voltage of node n7 (output of dual input switch-capacitor sampler 402a) is sampled by switches S100 and S200 to generate Vbg and Vbe for sigma-delta ADC 203. In one embodiment, architecture 400 comprises switch S100 which is controllable by a signal which is generated by performing logical AND operation of clock signals $\Phi_2$ and $\Phi'_1$. In one embodiment, switch S100 is operable to couple node n7 to node Vbg. In one embodiment, architecture 400 comprises capacitor C3 coupled to node Vbg and ground.

In one embodiment, architecture 400 comprises switch S200 which is controllable by a signal which is generated by performing logical AND operation of clock signals $\Phi_2$ and $\Phi'_2$, where $\Phi'_2$ is derived from $\Phi_2$ by dividing $\Phi_2$ by two. In one embodiment, switch S200 is operable to couple node n7 to node Vbe. In one embodiment, architecture 400 comprises capacitor C4 coupled to node Vbe and ground. Unlike the embodiment of FIG. 2 and FIG. 3, sigma-delta ADC 203 of architecture 400 operates using a clock signal having a frequency for switching which is half as slow as the clock signal used to operate sigma-delta ADC 203 of FIG. 2 and FIG. 3. In one embodiment, sigma-delta ADC 203 of architecture 400 operates using a clock signal having a frequency for switching which is twice as fast as the frequency of clock signal used to operate sigma-delta ADC 203 of FIG. 2 and FIG. 3.

In one embodiment, sampler 402a changes its sampling designation each half cycle. For example, when switch S1 is open (i.e., the diode D1 branch is not coupled to node n4 through switch S1, sampler 402a provides Vbe to sigma-delta ADC 203 via switch S200. In one embodiment, when switch S1 is closed (i.e., the diode D1 branch is coupled to node n4, sampler 402a provides Vbg to sigma-delta ADC 203 via switch S100. In one embodiment, voltage of Vbe and Vbg are retained by capacitors C4 and C3 respectively. In one embodiment, voltages on capacitors C4 and C3 are updated alternatively, and so Vbe and Vbg are updated alternatively.

Figure 5:
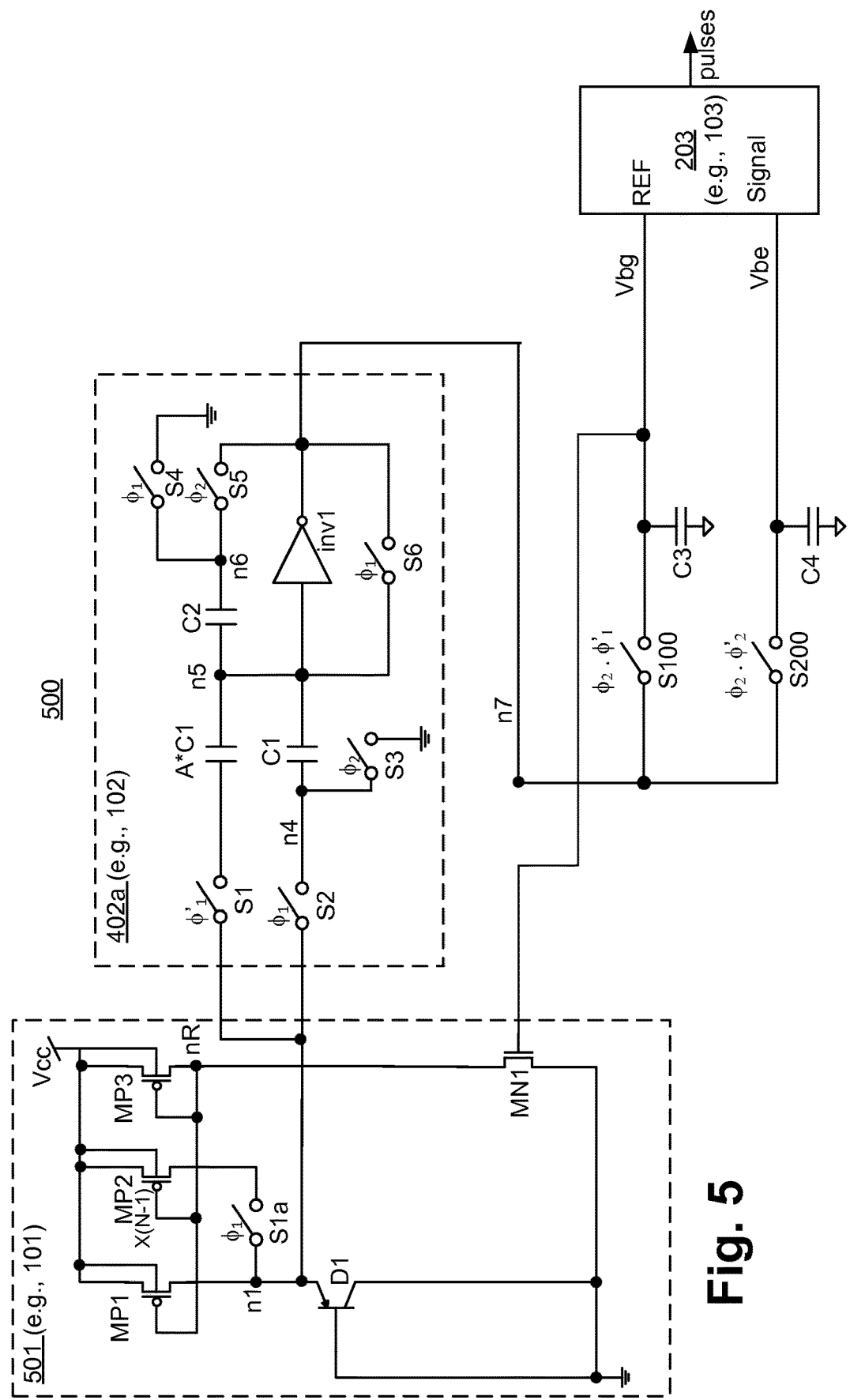
FIG. 5 is a closed loop switch-capacitor based bandgap reference generator, according to one embodiment of the disclosure.

FIG. 5 is architecture 500 of a closed loop switch-capacitor based bandgap reference generator, according to one embodiment. It is pointed out that those elements of FIG. 5 having the same reference numbers (or names) as the elements of any other figure can operate or function in any manner similar to that described, but are not limited to such. Architecture 500 is similar to architecture 400. So as not to obscure the embodiments, differences between architectures 500 and 400 are discussed. Architecture is a closed loop system (unlike architecture 400) and is used to provide bandgap reference and Vbe for thermal sensing. In one embodiment, the closed loop configuration of architecture 400 can be applied to all embodiments, where instead of an independent current source the reference voltage controls the diode current.

In one embodiment, architecture 500 comprises a forward biased diode circuit 501 (e.g., 101) which is similar to forward biased diode circuit 401 of architecture 400. In one embodiment, architecture 500 comprises a switch-capacitor sampler 502a which is similar to first switch-capacitor sampler 402a. In this embodiment, n-type transistor MN1 replaces Iref of FIG. 4. Here, source terminal of MN1 is coupled to ground, drain terminal of MN1 is coupled to node nR, and gate terminal is coupled to node Vbg. In this embodiment, closed loop (i.e., feedback loop) is formed by feeding back Vbg to control MN1. In one embodiment, the feedback loop of architecture 500 acts as an error amplifier with a negative feedback keeping the difference between the PTAT and Vbe substantially fixed.

Figure 6:
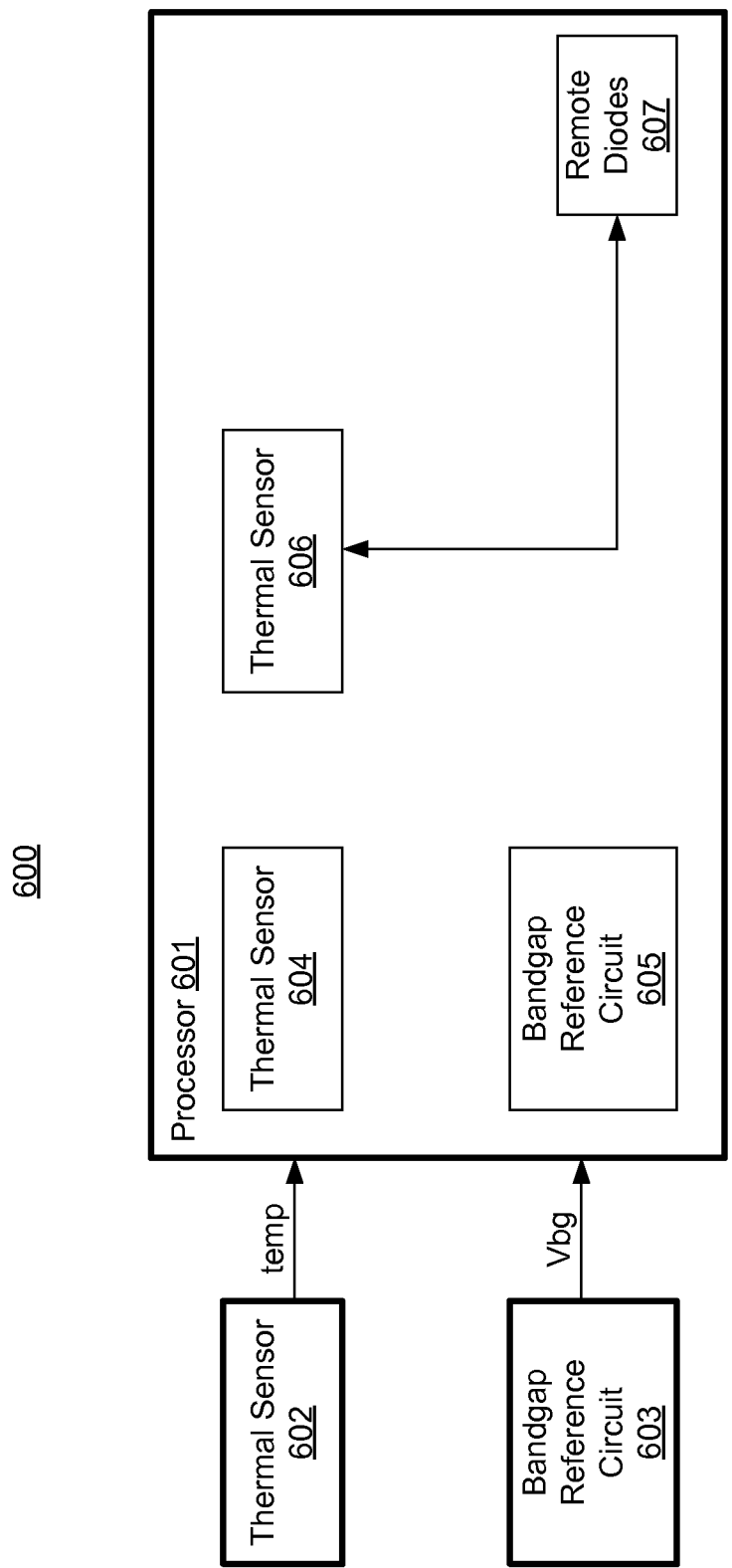
FIG. 6 is a processor with bandgap reference generator and digital thermal sensor, according to one embodiment of the disclosure.

FIG. 6 is architecture 600 with processor with bandgap reference generator and digital thermal sensor, according to one embodiment. It is pointed out that those elements of FIG. 6 having the same reference numbers (or names) as the elements of any other figure can operate or function in any manner similar to that described, but are not limited to such.

In one embodiment, architecture 600 comprises processor 601, thermal sensor 602, and bandgap reference circuit 603. In one embodiment, thermal sensor 602 resides outside processor 601 and is used to sense temperature external to processor 601. In such an embodiment, thermal sensor 602 provides the temperature "temp" to processor 601 for further processing. In one embodiment, bandgap reference circuit 603 is used to provide a bandgap reference Vbg to processor 601. In one embodiment, thermal sensor 602 is implemented according to any one of embodiments of FIGS. 1-4 and FIGS. 7-8. In one embodiment, bandgap reference circuit 603 is implemented according to embodiment of FIG. 5.

In one embodiment, processor 601 comprises thermal sensor 604 to measure on-die temperature of processor 601. In one embodiment, thermal sensor 604 is implemented according to any one of embodiments of FIGS. 1-4 and FIGS. 7-8. In one embodiment, processor 601 comprises bandgap reference circuit 605 to provide bandgap reference another circuit of processor 601. In one embodiment, bandgap reference circuit 605 is implemented according to embodiment of FIG. 5.

In one embodiment, processor 601 comprises a remote thermal sensor 606 with remote diodes 607. In this embodiment, diode D1 and/or diode D2 of forward biased diode circuit (according to embodiments of FIGS. 1-4 and FIGS. 7-8) are remotely positioned relative to the location of thermal sensor 606. The rest of the thermal sensor 606 is according to any one of embodiments of FIGS. 1-4 and FIGS. 7-8. For example, diode D1 and/or diode D2 may be placed in hot spots of processor 601 without having to place the entire thermal sensor in those hot spots. In one embodiment, processor 601 comprises a power control unit PCU (not shown) to process temperature readings from external and internal thermal sensors to manage power consumption (i.e., performance) of processor 601.

Figure 7:
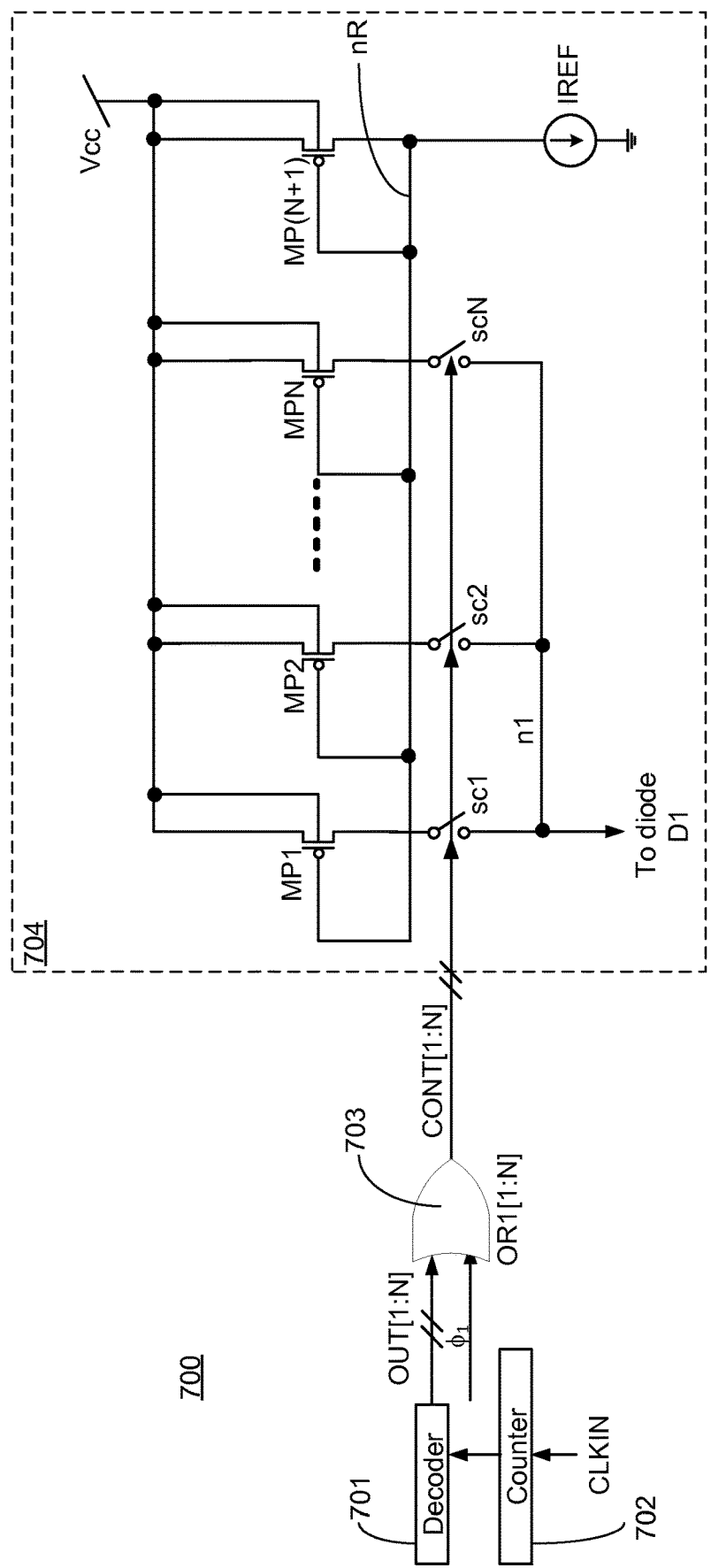
FIG. 7 is a circuit illustrating rotating switches in a forward biased diode circuit for dynamic matching in a single diode switch-capacitor based digital thermal sensor, according to one embodiment of the disclosure.

FIG. 7 is a circuit 700 illustrating rotating switches in a forward biased diode circuit for dynamic matching in a single diode switch-capacitor based digital thermal sensor, according to one embodiment of the disclosure. It is pointed out that those elements of FIG. 7 having the same reference numbers (or names) as the elements of any other figure can operate or function in any manner similar to that described, but are not limited to such.

The embodiment of FIG. 7 may be applicable to other embodiments explained here with single diode forward biased diode circuits (e.g., FIGS. 3-5). In one embodiment, circuit 700 comprises a decoder 701, counter 702, logic gate 703, rotating switch based forward biased diode circuit 704. In one embodiment, counter 702 is an up or down counter which counts up or down every clock cycle CLKIN. In one embodiment, output of counter 702 is converted into an 'N' bit output OUT[1:N] by decoder 701. In one embodiment, decoder 701 is a thermometer decoder. However, the embodiments are not limited to thermometer decoder. Other decoding schemes may also be used in the embodiments.

In one embodiment, logic gate 703 (e.g., OR logic gate) generates control signal CONT[1:N] to dynamically rotate switches sc1-scN, where 'N' is an integer greater than 1. In one embodiment, logic gate 703 performs an OR function between output of decoder 701 and first phase of clock i.e., $\Phi_1$. In one embodiment, by continuously turning on and off the switches sc1-scN, while keeping current thought diode D1 constant, inaccuracies in the thermal sensor measurement or bandgap reference are averaged.

In one embodiment, during the first phase of clock $\Phi_1$, all the switches are closed and the current through the diode D1 is high (resulting in node n1 having voltage V1). In one embodiment, during $\Phi_2$ only one switch is open leading to low current density (resulting in node n1 having voltage V2). In this embodiment, the remaining switches are open. The switch which is closed during $\Phi_2$ changes each cycle according to the decoder output OUT[1:N], and therefore mitigating random variations between the different devices MPX, where 'X' is an integer ranging from 1 to N+1 (where 'N' is also an integer).

In one embodiment, forward biased diode circuit 704 (which here is shown without diode D1 for simplicity sake) comprises N+1 current sources, were 'N' is an integer greater than 1. In one embodiment, drain terminals of MP1-MPN are coupled to switches sc1-scN respectively. In one embodiment, other end of switches is coupled to node n1 which is then coupled to diode D1. In one embodiment, gate terminals of MN1-MP(N+1) is coupled to node nR. In one embodiment, switches sc1-scN are controlled by CONT[1:N] signal. In one embodiment, switches sc1-scN are implemented as p-type transistors, n-type transistors, or combination of both.

Figure 8:
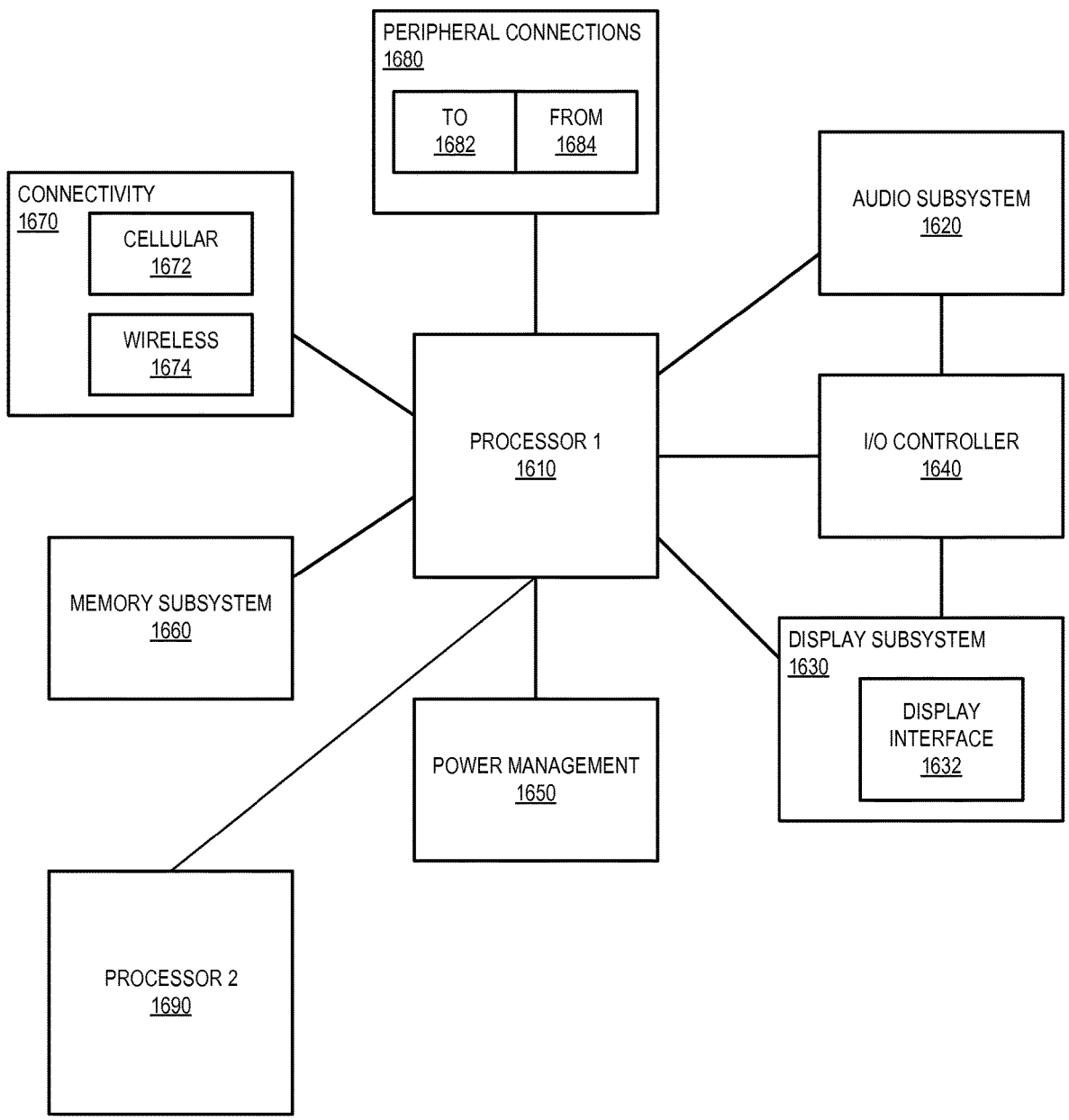
FIG. 8 is a smart device or a computer system or an SoC (system-on-chip) with the bandgap reference architecture, according to one embodiment of the disclosure.

FIG. 8 is a smart device or a computer system or an SoC (system-on-chip) with the bandgap reference architecture, according to one embodiment of the disclosure. It is pointed out that those elements of FIG. 8 having the same reference numbers (or names) as the elements of any other figure can operate or function in any manner similar to that described, but are not limited to such.

FIG. 8 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with the bandgap reference and thermal sensor architecture described with reference to embodiments discussed. Other blocks of the computing device 1600 may also include apparatus of with bandgap reference and thermal sensor architecture described with reference to embodiments. The various embodiments of the present disclosure may also comprise a network interface within 1670 such as a wireless interface so that a system embodiment may be incorporated into a wireless device, for example, cell phone or personal digital assistant or a wearable device.

In one embodiment, processor 1610 (and/or processor 1690) can include one or more physical devices, such as microprocessors, application processors, microcontrollers, programmable logic devices, or other processing means. Processor 1690 may be optional. While the embodiment shows two processors, a single or more than two processors may be used. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment, an apparatus independent of an operational amplifier is provided. The apparatus comprises: a forward biased diode circuit having one or more diodes; a first switch-capacitor sampler coupled to the forward biased diode circuit, the first switch-capacitor sampler to provide a reference voltage which is proportional to absolute temperature; and a second switch-capacitor sampler coupled to the forward biased diode circuit.

In one embodiment, the first switch-capacitor sampler is a dual input switch-capacitor sampler. In one embodiment, the second switch-capacitor sampler is a single input switch-capacitor sampler. In one embodiment, the apparatus comprises a sigma-delta analog-to-digital converter coupled to the first and second switch-capacitor samplers. In one embodiment, the sigma-delta analog-to-digital converter to receive the reference voltage from the first switch-capacitor sampler and a diode voltage from the second switch-capacitor sampler.

In one embodiment, the apparatus further comprises a counter to count a number of pulses output from the sigma-delta analog-to-digital converter. In one embodiment, the forward biased diode circuit comprises: a first branch having a first current source and a single diode. In one embodiment, the forward biased diode circuit comprises: a second branch having a second current source and a diode with multiple instances; and a third branch having a third current source to provide reference current.

In one embodiment, the first switch-capacitor sampler has a first input coupled to the second branch, and a second input coupled to the first branch. In one embodiment, the second switch-capacitor sampler has an input coupled to the first branch. In one embodiment, the first switch-capacitor sampler has a first input coupled to the first branch, and a second input coupled to the first branch. In one embodiment, the one or more diodes are positioned remotely from other devices of the forward biased diode circuit.

In another example, a system comprises: a memory; a processor, coupled to the memory, the processor including a thermal sensor according to apparatus discussed above; and a wireless interface for allowing the processor to communicate with another device. In one embodiment, the system further comprises a display unit. In one embodiment, the display unit is a touch screen.

In another example, an apparatus to generate a bandgap reference is provided. The apparatus comprises: a forward biased diode circuit having one or more diodes; and a dual input switch-capacitor sampler coupled to the forward biased diode circuit, the dual input switch-capacitor sampler to provide a bandgap voltage reference which is used as a feedback to control reference current through the forward biased diode. In one embodiment, the forward biased diode circuit includes a switch coupled to two sets of current sources, and coupled to a single diode. In one embodiment, the forward biased diode circuit includes an n-type transistor controllable by the bandgap voltage reference.

In another example, a system comprises: a memory; a processor, coupled to the memory, the processor including a bandgap reference circuit according to the apparatus discussed above; and a wireless interface for allowing the processor to communicate with another device. In one embodiment, the system further comprises a display unit. In one embodiment, the display unit is a touch screen.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus comprising:
   a forward biased diode circuit having a first diode and a second diode and a forward biased diode circuit switch coupled to the first diode;

a first switch-capacitor sampler coupled to the forward biased diode circuit, the first switch-capacitor sampler to provide a reference voltage which is proportional to absolute temperature, wherein the first switch-capacitor sampler includes a first switch coupled to the first diode by way of the forward biased diode circuit switch and the second diode and a second switch coupled to the first diode, the first and second switches allow the first switch-capacitor sampler to receive voltages at different nodes coupled to the first and second diodes of the forward biased diode circuit, wherein the first and second diodes coupled to the first and second switches, respectively, are not coupled to an operational amplifier and wherein the forward biased diode circuit switch and the second switch are controlled by a first clock signal and the first switch is controlled by a second clock signal which is an inverse of the first clock signal;

a second switch-capacitor sampler coupled to the forward biased diode circuit; and a sigma-delta analog-to-digital converter coupled to the first and second switch-capacitor samplers, wherein the sigma-delta analog-to-digital converter to receive the reference voltage from the first switch-capacitor sampler and a diode voltage from the second switch-capacitor sampler.

2. The apparatus of claim 1, wherein the first switch-capacitor sampler is a dual input switch-capacitor sampler.

3. The apparatus of claim 1 further comprises a counter to count a number of pulses output from the sigma-delta analog-to-digital converter.

4. The apparatus of claim 1, wherein the forward biased diode circuit comprises:
a first branch having a first current source and the first diode.

5. The apparatus of claim 4, wherein the second switch-capacitor sampler has an input coupled to the first branch.

6. The apparatus of claim 1, wherein the first and second diodes are positioned remotely from other devices of the forward biased diode circuit.

7. The system of claim 1 further comprises a display unit.

8. The system of claim 7, wherein the display unit is a touch screen.

9. An apparatus comprising:
a forward biased diode circuit having a first diode and a second diode and a forward biased diode circuit switch coupled to the first diode, wherein the forward biased diode circuit comprises
a first branch having a first current source and the first diode,
a second branch having a second current source and the second diode with multiple instance, and
a third branch having a third current source to provide reference current;
a first switch-capacitor sampler coupled to the forward biased diode circuit, the first switch-capacitor sampler to provide a reference voltage which is proportional to absolute temperature, wherein the first switch-capacitor sampler includes a first switch coupled to the first diode by way of the forward biased diode circuit switch and the second diode and a second switch coupled to the first diode, the first and second switches allow the first switch-capacitor sampler to receive voltages at different nodes coupled to the first and second diodes of the forward biased diode circuit, wherein the first and second diodes coupled to the first and second switches, respectively, are not coupled to an operational amplifier and wherein the forward biased diode circuit switch and the second switch are controlled by a first clock signal and the first switch is controlled by a second clock signal which is an inverse of the first clock signal;
a second switch-capacitor sampler coupled to the forward biased diode circuit.

10. The apparatus of claim 9, wherein the first switch-capacitor sampler has a first input coupled to the second branch, and a second input coupled to the first branch.

11. A system comprising:
a forward biased diode circuit having a first diode and a second diode and a forward biased diode circuit switch coupled to the first diode;
a first switch-capacitor sampler coupled to the forward biased diode circuit, the first switch-capacitor sampler includes a first switch coupled to the first diode by way of the forward biased diode circuit switch and the second diode and a second switch coupled to the first diode, the first and second switches allow the first switch-capacitor sampler to receive voltages at different nodes coupled to the first and second diodes of the forward biased diode circuit, wherein the first and second diodes are coupled to the first and second switches, respectively, and wherein the forward biased diode circuit switch and the second switch are controlled by a first clock signal and the first switch is controlled by a second clock signal which is an inverse of the first clock signal;
a second switch-capacitor sampler coupled to the forward biased diode circuit; and
a sigma-delta analog-to-digital converter coupled to the first and second switch-capacitor samplers, wherein the sigma-delta analog-to-digital converter to receive a voltage from the first switch-capacitor sampler and a diode voltage from the second switch-capacitor sampler.

* * * * *